US009779841B2

(12) United States Patent
James et al.

(10) Patent No.: US 9,779,841 B2
(45) Date of Patent: Oct. 3, 2017

(54) PROCESS FOR THE ACCURATE CHARACTERIZATION OF LOW LEVEL NUCLEAR WASTE

(71) Applicants: David W James, North Oaks, MN (US); Tom Kalinowski, Blaine, MN (US)

(72) Inventors: David W James, North Oaks, MN (US); Tom Kalinowski, Blaine, MN (US)

(73) Assignee: DW JAMES CONSULTING, LLC, Shoreview, MN (US)

( * ) Notice: Subject to any disclaimer, the term of this patent is extended or adjusted under 35 U.S.C. 154(b) by 872 days.

(21) Appl. No.: 14/186,536

(22) Filed: Feb. 21, 2014

(65) Prior Publication Data
US 2016/0203881 A1 Jul. 14, 2016

(51) Int. Cl.
G21C 17/022 (2006.01)
G21C 17/00 (2006.01)
(Continued)

(52) U.S. Cl.
CPC ......... G21C 17/002 (2013.01); G21C 17/022 (2013.01); G21C 19/307 (2013.01); G21F 9/12 (2013.01)

(58) Field of Classification Search
CPC .. G21C 17/002; G21C 17/022; G21C 19/307; G21F 9/12
(Continued)

(56) References Cited

U.S. PATENT DOCUMENTS 4,229,654 A * 10/1980 Arya ................... G21C 17/063
250/358.1
4,617,169 A 10/1986 Brodzinski et al.
(Continued)

FOREIGN PATENT DOCUMENTS

| EP | 0262823 | 4/1988 |
|---|---|---|
| WO | WO 89/08316 | 9/1989 |
| WO | 93/23770 | 11/1993 |

OTHER PUBLICATIONS

Preedy, Victor R., Gerard N. Burrow, and Ronald Ross Watson, eds.Comprehensive handbook of iodine: nutritional, biochemical, pathological and therapeutic aspects. Academic Press, 2009. Available online: <https://books.google.com/books?id=7v7g5XoCQQwC&>.*

(Continued)

Primary Examiner — Jack W Keith
Assistant Examiner — Lily C Garner
(74) Attorney, Agent, or Firm — Sten Hakanson (57) ABSTRACT

A method of determining and quantifying the presence and concentration of regulated radionuclides present in filter material used to remove radionuclide contaminants from the cooling water of a nuclear reactor. Multiple samples of the reactor cooling water are taken and the presence and concentration of directly measurable fission and activation produced radionuclides are determined through gamma spectroscopy. The release rate of radioactivity from the reactor as a function of the removal rate of the filter material is determined at equilibrium. The presence and the concentration of the indirectly measured fission regulated radionuclides are determined as a function of release rates of the directly measurable fission produced isotopes.

7 Claims, 3 Drawing Sheets

(51) Int. Cl.
    *G21F 9/12*     (2006.01)
    *G21C 19/307*   (2006.01)
(58) Field of Classification Search
    USPC .......................................................... 376/313
    See application file for complete search history.

(56) References Cited

U.S. PATENT DOCUMENTS

| | | | | |
|---|---|---|---|---|
| 5,257,297 A | * | 10/1993 | Reda | G01T 7/02 250/430 |
| 5,489,737 A | * | 2/1996 | Baba | G21F 9/008 588/19 |
| 6,791,093 B2 | | 9/2004 | Caldwell et al. | |

OTHER PUBLICATIONS

V.M. Efremenkov, "Radioactive waste management at nuclear power plants", IAEA Bulletin, Apr. 1989 pp. 37-42.

* cited by examiner

Decay Constant (1/sec.)
Reactor Coolant Data Analysis Results                Date:                  3/27/2012
Isotope Activation (μCi/ml)

| | | | |
|---|---|---|---|
| I-131 | 2.8400E-005 | I-132 | 6.1100E-004 |
| I-133 | 3.2600E-004 | I-134 | 1.0400E-003 |
| L-135 | 7.7700E-004 | | |
| Cs-134 | 3.3900E-005 | Cs-137 | 1.4000E-005 |
| Co-80 | 7.1600E-005 | | |
| Reactor % Power | 1.0000E+002 | Letdown Flow | 5.1672E+003 |

Analysis Results:

| | | | |
|---|---|---|---|
| Escape Rate Coefficient | 2.0893E-005 | Exposed Fuel Fraction | 2.0000E-002 |
| Defective Fuel Fraction | 9.8000E-001 | Recoil Fraction | 8.5007E-001 |
| Diffusion Fraction | 1.2160E-001 | Knockout Fraction | 2.8335E-002 |
| Convergence | 1.2557E-001 | | |
| Defective Fuel Age | 1.0000E+003 | | |

| Nuclide | Inst. Release Rate [μCi/sec.] | Daily Release [Ci/day] | Coolant Conc. [μCi/cc] |
|---|---|---|---|
| I-129 | 12.0279E-008 | 1.7521E-009 | 8.9119E-014 |
| Tc-99 | 1.9735E-008 | 1.7052E-007 | 6.7289E-012 |
| Sr-90 | 9.8573E-005 | 8.5167E-008 | 3.3597E-010 |
| Pu-239 | 5.2254E-007 | 4.5147E-008 | 1.7810E-012 |

| Using Cs-137 | Analysis Check Measured | Calculated ANS | Calculated RSS |
|---|---|---|---|
| Cs-137 (μCi/sec.) | 7.6067E-001 | 5.3473E-002 | 7.3681E-002 |

Fig. 3

Cumlative Activity I-129DRR over time in Curies.

PROCESS FOR THE ACCURATE CHARACTERIZATION OF LOW LEVEL NUCLEAR WASTE

FIELD OF THE INVENTION

The present invention relates generally to the characterization of nuclear waste, and more specifically to the accurate characterization of low level nuclear waste as removed from the cooling water of a nuclear reactor.

BACKGROUND OF THE INVENTION

Radioactive waste is generated primarily by nuclear power plants but also by hospitals, research laboratories and the like. Radioactive waste in the United States falls into a number of categories; most prominent are High Level Waste (HLW) and Low Level Waste (LLW). Included in the category of HLW is spent nuclear fuel along with some other radioactive waste not considered suitable for near surface disposal. LLW is generated at and within the controlled areas of commercial nuclear reactors, in hospitals, at public and private research facilities, and the like. Of particular concern is the LLW generated at nuclear power plants relative to the filtration processes employed to keep the water surrounding the reactor and the spent fuel clean and free of contaminating ions. Such filter material is comprised of such things as ion exchange resins, filter media and cartridge filters.

Primary responsibility for the disposition of HLW and federally generated LLW falls under the United States Department of Energy (DOE). Responsibility for the disposition of commercially generated LLW (e.g. hospitals, institutions, industrial generators, as well as nuclear power plants) is assigned to the States by the Low Level Waste Policy Act of 1980, as amended in 1985. The Nuclear Regulatory Commission (NRC) provides general criteria for the disposal of LLW through Title 10, Part 61 of the Code of Federal Regulations. Section 61.55 thereof defines three classes of LLW; A, B and C. Class A waste is the least radioactive, B is intermediate and C is the most radioactive. Class A is suitable for near ground level storage, whereas B and C level waste require progressively more secure and deeper storage which entails progressively greater storage expense. Classification depends upon the presence or absence of certain radionuclides and the concentrations thereof. Those regulated radionuclides are set out in tables one and two below.

TABLE 1

Radionuclides from 10 CFR 61.55 Table 1

| Table 1 Radionuclide | Concentration curies per cubic meter |
|---|---|
| C-14 | 8 |
| C-14 in activated metal | 80 |
| Ni-59 in activated metal | 220 |
| Nb-94 in activated metal | 0.2 |
| Tc-99 | 3 |
| I-129 | 0.08 |
| Alpha emitting transuranic nuclides with half-life greater than 5 years | [1]100 |
| Pu-241 | [1]3,500 |
| Cm-242 | [1]20,000 |

[1]Units are nanocuries per gram.

TABLE 2

Radionuclides from 10 CFR 61.55 Table 2

| Table 2 Radionuclide | Concentration, curies per cubic meter | | |
|---|---|---|---|
| | Col. 1 | Col. 2 | Col. 3 |
| Total of all nuclides with less than 5 year half-life | 700 | ([1]) | ([1]) |
| H-3 | 40 | ([1]) | ([1]) |
| Co-60 | 700 | ([1]) | ([1]) |
| Ni-63 | 3.5 | 70 | 700 |
| Ni-63 in activated metal | 35 | 700 | 7000 |
| Sr-90 | 0.04 | 150 | 7000 |
| Cs-137 | 1 | 44 | 4600 |

([1]) There are no limits established for these radionuclides in Class B or C wastes.

For Table 1 radionuclides, if the concentration is less than the table limit, the waste is Class C. If the concentration is less than 0.1 times the table limit the waste is Class A. For Table 2 radionuclides, each column represents the Class limit. For mixtures of radionuclides, the sum of the fractions determines the waste class as described in 10 CFR 61.55. In these tables, only $^{60}$Co and $^{137}$Cs are easily detected via gamma spectroscopy. All other radionuclides require detailed laboratory analysis and/or chemical separation to be quantified directly.

Generators of LLW are required to report the quantity of radioactivity associated with specific radionuclides to the disposal sites that are licensed to accept this waste. These specific radionuclides of importance for disposal are identified in the Code of Federal Regulations (CFR), Title 10; Part 61. This identification is part of an overall process to describe the physical, chemical, and radiological characteristics of the waste and to verify its suitability within various legal requirements for ultimate disposal. The required quantification of radioactivity is referred to as radiological characterization. The disposal site operators rely on this information to verify that the waste meets specific disposal requirements and to track overall inventory within allowable gross activity limits applied to the disposal site.

Radiological characterization involves determining what radionuclides are present in the waste and their concentrations so they can be disposed of properly. Such measurements are conducted in accordance with NRC guidance provided in two LLW Branch Technical Position (BTP) documents. The first NRC BTP document entitled "Waste Classification" issued in 1983 identifies four methods for determining radioactivity in waste. These include:

Materials Accountability—maintaining a specific inventory of radionuclides as received or created and adjusted for disposal.

Classification By Source—understanding and tracking the origin of the materials along with their radioactivity content.

Gross Radioactivity Measurements—Using survey instruments to measure radioactivity by energy absorption (dose rate) and inferring the concentrations from data collected from material of the same or comparable origin. This approach however cannot be used in isolation since prior knowledge of the relative distribution of radionuclides is required.

Direct measurement of individual radionuclides—Sampling and analyzing the specific material to be disposed of.

Any or all of these methods can be used to characterize the class of the LLW. The second NRC BTP document on "Concentration Averaging and Encapsulation" issued in 1995 set limitations on the ability to average wastes of different radioactive isotopic concentrations and gave guidance for determining weights and volumes to be used for classification. The 1995 BTP did not limit any of the methods that could be used to initially determine activity content. The methods currently used tend to rely primarily on gross radioactivity measurements and direct measurement methods. The largest volumes of radioactive waste are generated by nuclear power plants and are most often characterized using single samples of the final waste form. Difficult-to-measure radionuclides are measured either directly on the basis of a single sample or using statistical correlations to radionuclides that are more readily measured with available equipment based on sample data collected over 3-5 years.

However, the characterization process of using samples of the final waste form is flawed for a number of reasons. Obtaining truly representative samples of utility waste streams is problematic. Since regulatory guidance didn't come into play until after the final designs of today's operating plants, many waste characterization and processing systems do not have the capability of sampling until wastes from multiple collection points have been transferred to a collection/receiving container or tank. Some systems do not have sampling capabilities until after the waste has been transferred into the actual disposal containers. Mixing capabilities are varied with some sites having no mixing capability at all such that the waste material has little or no homogeneity. Tank designs or operations may not allow complete removal of all material on discharge to a waste container resulting in a mixture of waste from different operating periods. The collection of multiple samples for a particular batch of waste is frequently not possible due to worker radiation exposure concerns and waste sample sizes are frequently limited to less than 500 grams. The size of a sample sent to an offsite laboratory is often limited by activity and laboratory license restrictions to amounts less than 1 gram. On-site samples used for gamma spectroscopy are sometimes less than 1 milligram. The results from such samples cannot be assumed to be truly statistically representative of all the material in a particular storage container. As is well understood, the number of samples (n) required to establish a statistically meaningful result at a specified precision can be calculated using the following equation:

$$n = t_a^2 + S^2/D_2$$

Equation 1

Where, D represents the precision level,
$t_a$ is the Student T-test Value, and
$S^2$ is the standard deviation of the data set.

Based on the foregoing equation, to achieve a precision of a factor of 10, as required by the previously referenced BTP on concentration averaging, requires a sample set $S^2=0.628$. The result of this calculation is that 116 samples are needed to achieve the required precision. At a cost of approximately $2,000 per sample analysis, increasing the number of samples to this level is not a viable approach from an overall cost perspective.

Figure 1:
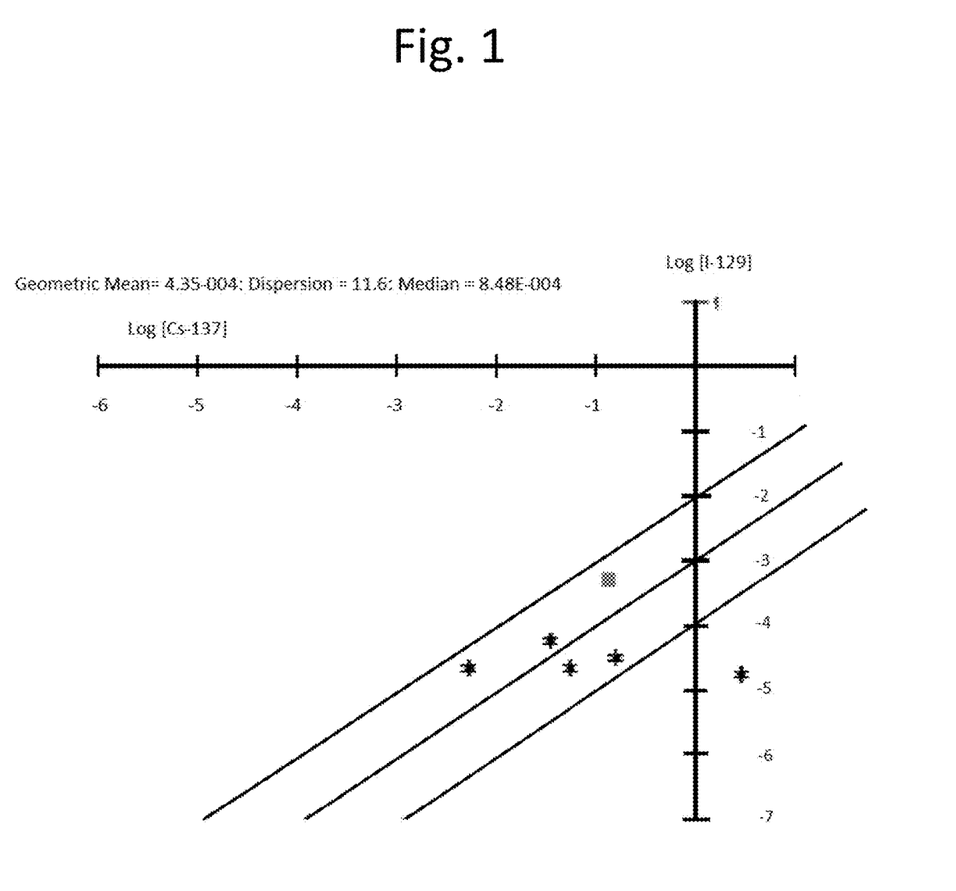
FIG. 1 shows an I-129/Cs-137 Scaling Factor Plot.

The derivation of scaling factors for the difficult to detect radionuclides using common laboratory practices is also fraught with inaccuracy. Following current practice, the inventory of $^{129}$I, for example, would be determined by a scaling factor derived from endpoint sampling. As seen by referring to the scaling factor plot of FIG. 1, represented therein is scaling factor data from a nuclear power plant based on end-point waste samples. In this case, the quantity of $^{129}$I is shown as a ratio to the quantity of $^{137}$Cs. Since $^{137}$Cs is more easily detected, the quantity of $^{129}$I in the waste would be determined by multiplying the $^{137}$Cs activity by the scaling factor.

In this case, the scaling factor based on detection limits would be <4.36×10$^{-4}$ for primary resins alone. A corresponding average $^{137}$Cs value is 0.961 μCi/cc. Scaling up from these values results in an estimated $^{137}$Cs inventory of ~0.091 Curies and a corresponding $^{129}$I value of (something less than) 39.56 μCi. This compares with the coolant based estimated total release of 0.0514 μCi over the same time period. The reported activity from scaling factors derived from waste sampling is almost 3 orders of magnitude higher. Current practices provide no alternative to reporting the most restrictive value. Another point to be noted from the data above is that the five values indicated by asterisks in FIG. 1 by are not actual quantities for $^{129}$I but are in fact the detection limits of the analysis technique. The actual value is therefore something less than the reported value. Also, the plot indicates that for a change in $^{137}$Cs values over approximately three orders of magnitude, the $^{129}$I values remain the same. There is therefore, no correlation between the two radionuclides and the scaling factor derived from this data is extremely inaccurate at best.

Thus, standard practice is to err on the conservative side and categorize a LLW as being in a more restrictive class such as Class B instead of Class A, or Class C instead of B. Additionally, even where evaluating data from multiple samples is done, prior art characterization procedure involves preferentially including high-side variations in each of the sample values and excluding low side variations in an attempt to avoid the perception of a non-conservative evaluation. In both cases, the result is to frequently over specify concentrations of disposal limiting radionuclides which often leads to significantly higher disposal costs and a waste of disposal resources than would otherwise be required if the waste was more accurately characterized. More precise characterization of such waste could save nuclear power plants millions of dollars in yearly operating costs. In addition, determining waste classification and disposal options after the waste is generated precludes the ability of the generator to manage the costs of waste generation and accurately predict operating costs.

SUMMARY OF THE INVENTION

The present invention comprises a method of following the transport of radionuclides from their point of origination to final waste forms, such as ion exchange and filtering system materials generated at nuclear power plants. The process is based on the understanding that the reactor core is the generation source of essentially all the contaminant radionuclides in the facility. As is understood by those of skill, all radioisotopes in LLW are produced either as fission products, introduced, for example, from fuel contamination on core surfaces or as leakage from breached fuel pins, or by activation whereby corrosion products from the reactor tank, and the various piping and valves through which the circulating reactor cooling water flows, are activated by neutron flux as they are carried by the cooling water through the reactor core. The tracking process is accomplished then by using existing data from reactor core cooling water samples that are routinely taken on a daily basis to maintain water chemistry parameters and track the performance of the nuclear core.

Those of skill can appreciate that the use of the cooling water data resolves the fundamental flaws in waste sampling because the sample media, water, is inherently homogeneous and well mixed. The frequency of such samples provides a statistically firm basis for establishing a meaningful confidence level for determining actual waste concentrations in the filter media. This sampling, which includes concentrations of a broad range of isotopes, provides sufficient information to determine the total release rates of various activation and fission products either by direct extrapolation or through mathematical inferences. Therefore, since all radionuclide production occurs in the reactor core, and radionuclide concentrations are maintained at a constant level in the reactor coolant by the first tier filtration removal processes, once a constant steady state is achieved the production rates and removal rates are analogous thereby permitting a tracking of the total radionuclide present in the filter waste as it accumulates over time. In this manner the waste materials can be very accurately quantified as to isotopes present in the waste and their concentrations thereby permitting accurate characterization of a particular batch of waste and the corresponding determination of proper disposal thereof.

A second potentially significant source of radioactivity transport finding its way into radioactive waste is from the spent fuel storage pool and other secondary sources. Since the spent fuel storage pool can communicate directly with reactor cooling water, such as during shutdown periods, a potentially significant amount of the activity can be introduced during this period of communication. While there is no definitive model for radionuclide releases within the spent fuel pool, fission products and activated metal isotopes may be leached from the stored fuel surfaces. In addition, there may be leaching directly from openings in the compromised fuel pins that may allow water contact and transport to the storage pool. Releases from these leaching pathways are separately estimated on the basis of liquid processing rates and measured process activity. Releases from leaching pathways in the spent fuel pool may not be significant enough to measurably affect the overall source term, but could dominate activity buildup in the spent fuel pool.

Pursuant to the characterization process of the present invention then, these two components of the source term are combined to create a daily release rate from all sources of radioactivity release from reactor fuel. This radioactivity is allocated to each stream generating mixable materials for disposal and comprises the overall source term for the facility. Radioactivity of disposal limiting radionuclides is determined directly by a calculation process from radionuclides measurable in the reactor and fuel pool coolant. Some corroborative sampling can also be performed to monitor the process and reinforce the accuracy of the characterization process herein.

The radioactivity allocated to each waste stream is tracked as an inventory in each batch or collection of waste from a given time period when the materials were in service. Each batch is tracked as it is moved from process vessels to storage tanks and finally to the waste disposal container. Radioactive decay of the materials is accounted for in the tracking process as the collection of material can take a considerable amount of time with a corresponding reduction in overall activity that is specific for each radionuclide.

Thus, the present invention is a process that involves tracking the radionuclide output of the core over time and accurately correlating that output with the radionuclide content of the waste contained in the filter waste material. This approach allows LLW waste to be more accurately characterized with a high degree of statistical assurance as opposed the current "rule-of-thumb" estimation process. As a result, over estimation errors can be eliminated as to the proper Class of the LLW so that it can be safely stored or disposed in the least costly manner.

DETAILED DESCRIPTION OF THE INVENTION

The accurate characterization process of the present invention is accomplished in part by evaluating radionuclide release rates from reactor core conditions based on 5 iodine isotopes ($^{131}$I, $^{132}$I, $^{133}$I, $^{134}$I, and $^{135}$I) and other routinely measured radionuclides including $^{58}$Co, $^{60}$Co, $^{134}$Cs, $^{137}$Cs, and $^{99}$Mo. Since these isotopes are monitored every day as they appear in reactor cooling water, it can be understood by those of skill that the frequency of observation and the inherent homogeneity of the reactor cooling water allows for a representative sample base with measurable statistics. Thus, the present invention includes a calculation process to determine the concentrations and daily release rates of specific radionuclides of interest to disposal in the reactor cooling water for the purpose of tracking their inventories in resin and other filter waste products. This calculation is performed daily on the reactor cooling water using gamma isotopic analysis. Difficult to measure radionuclides are estimated from known relationships between them and the more easily measured isotopes.

Effectively, the rate of change of activity in the reactor coolant is determined from the difference between the production of the isotope per unit time minus the removal of the same isotope per unit time. This is expressed mathematically by a first order differential equation as follows below in Equation 2 below.

$$\frac{\partial A_i}{\partial t} = \lambda_i N_i \sigma_i \varphi - A_i(\beta + \lambda_i) \quad \text{Equation 2}$$

Where:
$A_i$=activity of Nuclide I (Bq)
$\lambda_i$=Decay Constant (sec$^{-1}$)
$N_i$=Atomic density (atoms per cm$^3$)
$\sigma_I$=Absorption Cross section (10$^{-24}$ cm$^2$)
$\phi$=Neutron Flux Rate (n/cm$^2$-sec)
$\beta$=Reactor Coolant Cleanup Constant (sec$^{-1}$)

At Equilibrium, production equals removal, that is, where the term $$\frac{\partial A_i}{\partial t} = O,$$

radionuclides are being collected by the cleanup system as fast as they are being produced, i.e.:

$$\lambda_i N_i \sigma_i \phi = A_i(\beta + \lambda_i) \quad \text{Equilibrium Equation 3}$$

Using the results of this calculation and the known elemental removal efficiencies of the filters and demineralizers in the reactor cooling water treatment systems, the expected overall release of radioactivity from the reactor system is quantified.

Determining Production Rates of Fission Productions in Reactor Coolant.

The following provides a description of the mathematical equations which form the basis for the radionuclide releases from fuel in an operating reactor core. $^{129}$Iodine, which is important for disposal classification but not easily detectable, is released to reactor coolant from fuel that is outside of cladding (exposed) and from fuel that is contained within the fuel rod cladding during periods of cladding defects. It is released from fuel by the three basic release mechanisms of: recoil, diffusion and knockout.

In the recoil release mechanism, the fission fragments released at the fission site may cause considerable dislocation in the fuel matrix. If the fission site is at or near the fuel/coolant interface, the fission fragments will exit the fuel with little or no impedance and, therefore, with essentially no decay time. A recoil release mechanism will account for the appearance in the reactor coolant of short-lived nuclides with short-lived precursors. Because of very small decay constants or because of longer-lived precursors, a recoil release mechanism often does not account for a significant fraction of the long-lived nuclides that appear in coolant.

In the diffusion release, nuclides diffuse under a concentration gradient towards the fuel surface where they are either released or subjected to the knockout mechanism. At the relatively low fuel temperatures in operating LWR reactors, and particularly in the fuel adjacent the cladding or exposed to coolant, the diffusion of nuclides may be limited.

In the knockout mechanism, the nuclides located at the fuel/coolant interface are ejected from the fuel matrix by the fission fragments. The knockout mechanism will release both short and long-lived nuclides and is the dominant release mechanism for the long-lived nuclides. The knockout mechanism is generally independent of temperature and of the chemical species of the nuclides. The knockout or release rate is proportional to the nuclide concentrations or inventories in the fuel at the fuel/coolant interface. The knockout rate is small compared to the production rate of the nuclides and consequently the ratio of the release rates of nuclide pairs will approach the ratios of their respective inventories in fuel.

The three release processes are differentiated by their dependence on the decay constant lambda ($\lambda$) defined by the natural log of 2 divided by the radionuclide half-life in seconds. Recoil release is instantaneous and therefore there is no time for decay in the process and no dependence on lambda. Diffusion releases are have inverse dependence on the square root of lambda ($1/\sqrt{\lambda}$). In the case of knockout the dependence is on the reciprocal of lambda ($1/\lambda$).

Where fission products are released from tramp fuel (i.e. tiny fuel particles on fuel surfaces), these characteristics provide a basic explanation of the process since there is no intervening path between the fuel and the coolant. In this case, the isotopic ratios will correspond closely to the production ratios and appear to be produced by a constant fission rate. In the case of most fuel defects there is another dependency on diffusion ($1/\sqrt{\lambda}$) through the gap between the cladding and the fuel. Given the fission product yields and the half-lives, these dependencies can be used to determine the probability of an individual radionuclide to reach the reactor coolant. In the case of defects the apparent fission rates will not be identical rather they will be skewed by the additional $1/\sqrt{\lambda}$ dependency.

The five short-lived iodine isotopes $^{131,132,133,134,135}$I are also produced from exposed fuel and defective rods by the same three basic fuel release mechanisms. As is understood by those of skill, the five iodine isotopes each have relatively short half-lives of differing duration and each of the release sources and mechanisms has a different and known decay characteristic associated with it. Thus, the absolute and relative release rates of the five short-lived iodine isotopes will vary as a function of the relative contribution from each source and release mechanism. It is also understood that the half-lives are long enough to endure the release process and short enough that observable decay losses occur during the release and we know precisely the production ratios between these isotopes at the time of fission.

Based on the foregoing It can be appreciated that:

a. The release rate of $^{131}$I for a specified reactor operating period is known, based on the measured concentration of $^{131}$I in the reactor coolant.

b. The core and fuel release conditions for $^{131}$I can be estimated using measured concentrations of the five short-lived iodine isotopes to determine the relative contribution of $^{131}$I released from exposed fuel and defective rods and, in turn, the relative contributions from the three fuel release mechanisms.

c. The release ratios can then be established for other target isotopes relative to $^{131}$I for each of the core and fuel release conditions.

Therefore, by knowing the release rate of $^{131}$I, the estimated core and fuel release conditions and the release ratios for target isotopes relative to $^{131}$I that correspond to the core and fuel release conditions, the isotopic release rates can be determined. Thus, by observing the ratios thereof in the reactor coolant, we can make highly accurate inferences about the pathway the emerged from, e.g. whether the release was dominantly from tamp fuel or from defects in the individual fuel pins. This determination is made through the simultaneous solution of the following $^{131}$I ratio equation for the four ratios $^{132}$I/$^{131}$I, $^{133}$I/$^{131}$I, $^{134}$I/$^{131}$I, and $^{135}$I/$^{131}$I.

$$\frac{A_i}{A_j} = P_{ij} \qquad \text{Equation 4}$$
$$[(aq_1 + aq_2 h^{-0.5} + aq_3 h^{-1}) + (bq_4 + bq_5 h^{-0.5} + bq_6 h^{-1})h^{-m}]$$

Where:
$A_i/A_j$=Coolant activity ratio of top 4 iodine isotopes to $^{131}$I
$P_{ij}$=Instantaneous Production ratio defined by $$P_{ij} = \frac{\lambda_i y_i (\lambda_j + \beta)}{\lambda_j y_j (\lambda_i + \beta)}$$

where $\gamma_i$, $\lambda i$,i isotope fission yield and decay const,
$\beta$ is a reactor waste cleanup removal constant and
$\gamma$ is the relative fission yield
a=Tramp Fuel Fraction
b=Defective Fuel Fraction
h=the Lambda ratio to $^{131}$I ($^{13i}\lambda/^{131}\lambda$)
$q_1$, $q_2$, $q_3$=calculated fractional releases from recoil, diffusion and knockout from tramp fuel
$q_4$, $q_5$, $q_6$=calculated fractional releases from recoil, diffusion and knockout from defective fuel
m=calculated lambda dependence for transport in the clad gap (dependent of relative defect size)

From the relative concentrations of these nuclides, the calculation assesses the core and fuel release conditions which govern the release rates of the target radionuclides.

Table 3 summarizes the core and fuel release conditions that are required to be estimated in order to produce an estimate of the radionuclide release rates.

TABLE 3

Core and Fuel Release Conditions

Figure 2:
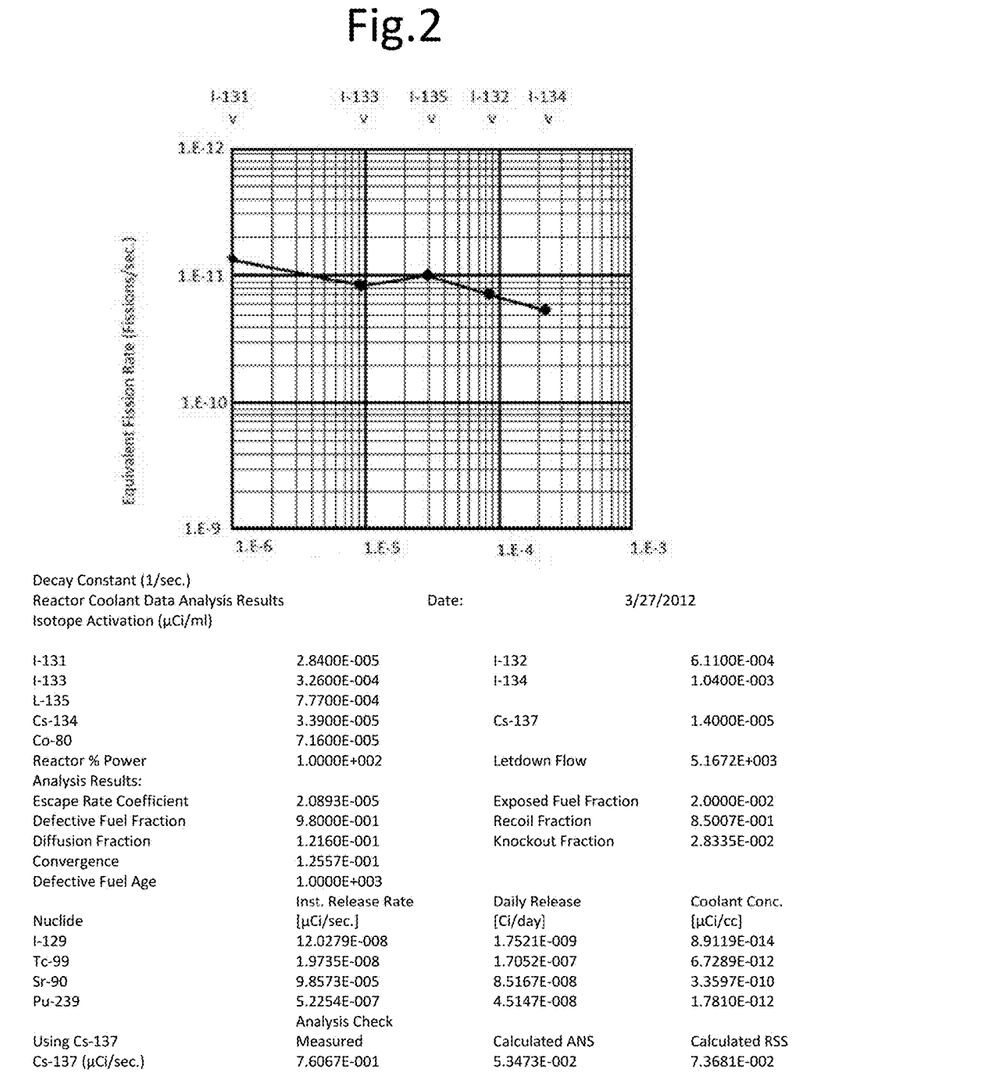
FIG. 2 shows an Example of a daily reactor coolant report.

Burn-up of defective fuel rods
Defect size
Fractional contribution of I-131 from
Exposed fuel
Defective fuel
Recoil release mechanism
Diffusion release mechanism
Knockout release mechanism An example of the daily reactor coolant activity report is shown in FIG. 2, below. As seen therein, the equivalent fission rate is plotted versus the isotope decay constant. The downward slope of the line indicates that release from defective fuel is dominating the activity distribution. A flat slope would indicate release dominated by tramp or exposed fuel. Other parameters are calculated as each new reactor coolant sample is brought into the data base.

Once the core and fuel conditions are estimated for the release of $^{131}$I, the release rate of $^{129}$I can be estimated by knowing the relationships between $^{131}$I and $^{129}$I for the release conditions. For other fission products similar relationships are required and can be determined using the same methodology. Those of skill will understand that this methodology as used for certain radionuclides is adjusted to account for specific physical characteristics. For example, for $^{99}$Tc, the methodology is adjusted as it is produced only from exposed fuel by the recoil and knockout release mechanisms. This is similarly true for $^{90}$Sr and various transuranic radionuclides (i.e. those with Atomic Numbers greater than 92).

Once the sources of production and fractional releases are established, we can extend our investigation to the production and release of other isotopes important to disposal based on their fission yield rates and their known transport properties. This includes those radionuclides not observed directly in the reactor coolant. For example, $^{129}$I will follow the same production and transport paths as the other iodine isotopes. $^{90}$Sr, which is known to resist diffusion both within the fuel and in the cladding gap, will most likely only come from tramp or directly exposed fuel.

As mentioned previously herein, radionuclides also important for disposal classification are produced through activation reactions rather than fission. For these radionuclides production of their parent elements results from erosion and corrosion in the reactor vessel and connected system piping. Particulates or soluble ions are transported by coolant into the reactor where they are activated by exposure to neutron flux. The activation potentials for each element are well known by those of skill and have been extensively well documented in various technical journals based on U.S. and international government research. As is known, there are two radionuclides of specific interest whose production is related to activation rather than fission processes; namely, $^{63}$Ni and $^{99}$Tc. These isotopes have relatively long half-lives and are difficult to detect. However, they are produced in proportion to the natural distribution of their parent isotope in elemental nickel and molybdenum respectively. In both cases, the activation of nickel and molybdenum also produces other isotopes that, although they have much shorter half-lives and are not seen in waste products, are readily detected in reactor coolant. Thus, the production and equilibrium concentrations of $^{63}$Ni and $^{99}$Tc can be predicted by measuring the equilibrium concentrations of $^{58}$Co and $^{99}$Mo in the reactor coolant. For $^{99}$Tc, the production from this mechanism can be added to the production quantity from fission. It is understood that the equations for both fission and activation production have been validated against actual sample data from operating nuclear power reactors and the test data utilized for such validation involve more sensitive analysis methods than are normally used for waste sample evaluation to ensure accurate quantification at the predicted concentrations. The determination of the origins of these radionuclides along with their coolant concentrations and removal rates enables the assessment of a cumulative inventory in the primary cleanup demineralizers which will be sent directly to a pre-disposal storage tank. Those of skill will understand that the present invention is not directed towards the quantifying and disposal of non-filterable LLW activated metal components, such as reactor control rods and the like.

The remaining radionuclide generation not taken up in the primary demineralizers is distributed through other pathways based on communication with the reactor coolant, e.g. collected leakage from reactor coolant pump and valve seal systems, processing through the liquid radioactive waste system during refueling operations and mixing with water in the spent fuel pool storage pool. The process of the present invention also tracks the quantities of activity through each of these secondary pathways to the respective end waste form. Thus, the spent fuel pool or other secondary sources of isotope production are evaluated in a similar manner. Periodic samples are taken of the coolant and equilibrium concentrations of the easily detected radionuclides are established. The removal mechanisms in the system are identified and the radionuclides important for disposal classification are quantified and tracked. The evaluation of iodine isotopes for fission product yields is not typically applicable outside of the operating reactor environment.

The reactor coolant flow to process demineralizers may be of limited duration and may be diluted in secondary processes. An initial evaluation will develop isotope specific equivalency factors for each flow stream as it compares with reactor coolant. This is based on sample histories for the secondary process along with a generalized water balance for water flowing into and out of the reactor and spent fuel pool. The equivalency factor will then be used to adjust isotopic uptake in the local filters and demineralizers through their service period. Water flows into and out or the reactor through various processes. These processes are necessary to provide back pressure on reactor coolant pump seals (seal injection system), to limit tritium buildup (controlled bleed), to support level control and the reactor heats up and cools down (charging system). The ultimate activity generation is matched with the inventory estimates based directly on the reactor coolant measurements and normalized to those estimates to limit over-specifying activity generation. Typical flow rates associated with reactor water level control are:

TABLE 4

Typical Reactor System Flow Rates

| Process | Flow Rate (gpm) | Function |
| --- | --- | --- |
| Charging | 90-100 | Refills reactor cooling system during startup and power cycling |

TABLE 4-continued

Typical Reactor System Flow Rates

| Process | Flow Rate (gpm) | Function |
| --- | --- | --- |
| Letdown and Purification | 75-120 | Moves excess water from the cooling system to the refueling water storage tank, recycles reactor coolant for cleanup |
| Controlled Bleed Off | 10-20 | Provides a purge flow to control the buildup of tritium |
| Seal water injection system | 30 gpm (in) 22 gpm bleed | Provides a back pressure on reactor coolant pump seals to limit leakage out of the reactor. Dominant direction of leakage is into the reactor |

Flow through secondary processes, such as the liquid radioactive waste system and spent fuel pool cleanup system, will take into account the degree to which they communicate with reactor coolant and their potential for acting as a supplemental source of radioactivity release from leaking fuel assemblies or from leaching of contamination from fuel and equipment surfaces. The overall process provides a dynamic inventory of radioactivity by isotope in each of the demineralizers bearing radioactively contaminated ion exchange resins. This information can then be used to track the inventory in the spent resin storage tanks and radioactive waste packages. The process is custom fitted to each participating plant considering its unique system configurations and operating practices. Isotopic activities are tracked by unit in multi-unit plants.

The process of the present invention begins by tracking the charging and discharging of the demineralizers along with the flow rate through the demineralizers. A cumulative activity is also calculated for each demineralizer which is updated on a daily basis as reactor coolant samples are entered and recorded. The cumulative activity is decayed by one day prior to each new addition to maintain the inventory consistent with the time period the activity was added to the container. This can be expressed by the following equation 5, where for a particular isotope i:

$$A_T(t+\Delta t) = A_T(t) * e^{-\lambda_i(\Delta t)} + \epsilon_i \dot{m} a_i((t+\Delta t)/2) \quad \text{Cumulative Activity Equation 5}$$

Where:
$A_T$=total accumulated activity of isotope i at time t and t+$\Delta t$
$\lambda_i$=decay constant of isotope i
$\dot{m}$=coolant flow rate out of the reactor considering all pathways in appropriate units
$a_i$=concentration of isotope i in the coolant flow stream
$\epsilon_i$=purification efficiency for isotope i considering all pathways The process presented in this application replaces the current practice of endpoint sampling of waste material with source based estimates using tried and true algorithms. It's not expected that this process will always return lower results, It is expected that properly applied the process will always be more accurate, will reduce the incidence of high rad sampling, and provide more consistent package characterizations.

ILLUSTRATIVE EXAMPLES

Estimating Fission Product Releases

Figure 3:
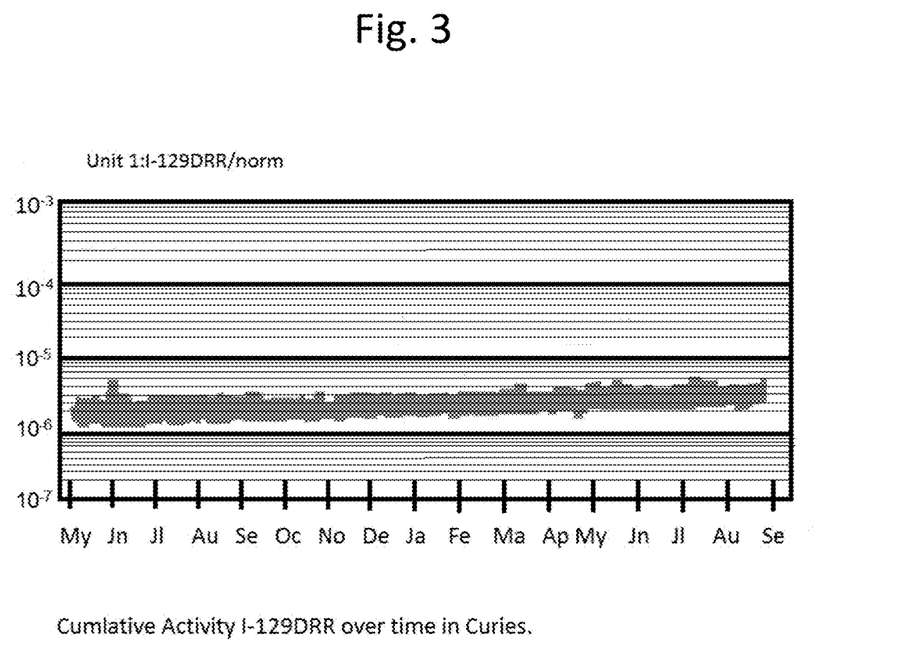
FIG. 3 shows a graph of Cumulative 129I Activity.

Consider the case of a primary cleanup resin bed where the bed operates for approximately 18 months at a flow rate of 120 gallons per minute. Reactor coolant samples are collected daily and subjected to gamma spectrum analysis. In current practice, these measurements would only be monitored to look for sudden increases indicating a change in reactor fuel integrity. In the proposed process of the invention herein, measurements from this analysis are passed into the algorithms discussed above to estimate the activities of long lived radioisotopes. In this case we are working with the estimates of $^{129}$I. We calculate the instantaneous release rate in activity per second of $^{129}$I. This is scaled up by multiplying the instantaneous release rate by the number of seconds in a day ($\times 86400$). The cumulative $^{129}$I activity collected in the bed is seen in FIG. 3 showing the daily release rate of $^{129}$I (I-129DRR). In this case, $^{129}$I is calculated for each sample from the iodine ratios and the cumulative activity is estimated from equation 5. This total release from reactor coolant would represent the contents of the demineralizer bed during this period of operation. The concentration of $^{129}$I (given a bed containing 25 ft$^3$ of resin with $5.14 \times 10^{-8}$ Ci) would be $5.4 \times 10^{-7}$ μCi/cm$^3$ well below the minimum detectable activity for this isotope.

The methodology is similarly applied to each of the other radionuclides important for disposal and the quantity of radioactivity generated during the time period for each isotope is added to the total for the vessel.

Estimating Non-Fission Product Radionuclides

Non fission product radionuclides are those produced by activation of stable isotopes emanating from construction materials or carried into the reactor by cooling systems or makeup water. Those collected in process systems are suspended in the reactor coolant and activated by neutron exposure in the reactor core, they are produced directly in the reactor coolant and they are not subject to the transport modeling applicable to fission product transport discussed above. Long lived difficult to measure activation radionuclides are tracked in this process through surrogates that are readily measured in the reactor coolant.

As an example, consider $^{63}$Ni which decays by beta emission with no accompanying gamma emission. In this case it is not measured in the daily gamma spectrometric measurements. $^{63}$Ni is produced by the activation of stable $^{62}$Ni. Elemental nickel has 5 stable isotopes in well-known proportions. These include atomic weights of 58, 60, 61, 62, and 64. We observe from known activation reactions that $^{58}$Co is produced from $^{58}$Ni by neutron absorption with a proton release. Since the elemental composition of nickel is already known and not significantly affected by this process, the production rate of $^{63}$Ni can be directly related to the production rate of $^{58}$Co which is a readily measured gamma emitting radionuclide and observed in the daily gamma spectrum analysis. The reactor coolant concentration of $^{58}$Co is then estimated by equation 3. We can go one step further using concentration calculating equation 6 to determine the reactor coolant concentration of $^{63}$Ni.

Concentration Calculating $$A_{63Ni} = A_{58Co}\left(\frac{\lambda_{63Ni}\sigma_{63Ni}(\beta + \lambda_{58Co})}{\lambda_{58Co}\sigma_{58Co}(\beta + \lambda_{63Ni})}\right) \quad \text{Equation 6}$$

Where:
A=respective Coolant concentration
λ=respective decay constant
σ=respective neutron cross section
β=Cleanup removal factor, common to both radionuclides The ratio between them in reactor coolant is directly proportional and constant. Having determined the coolant concentration of $^{63}$Ni, its ratio with $^{60}$Co can then be determined. Since $^{60}$Co has very similar transport properties to $^{63}$Ni and has a longer half-life than $^{58}$Co this ratio can be generally observed throughout the plant and will hold relatively constant through the disposal process.

Those of skill will appreciate that the methodology of the present invention is primarily performed using software which incorporates a database to maintain records of the data and that makes the mathematical calculations as are required for making the radionuclide determinations and inventory totals. The method of the present invention then involves determining the presence and amount of regulated fission products either directly or as is inferred as a function of the presence of other radionuclides as based on the contributory share of the production of the other radionuclides by the mechanisms of recoil, diffusion and knockout. To these fission products are added the contribution of other regulated radionuclides created through activation as determined through an equilibrium calculation thereof based on the removal efficiency of the filter material. Any contribution from secondary sources is also determined and added to the total of the fission and activation radionuclides. Once the activity in a filtration system during a time period is established, the removal of that material to interim storage tanks is also tracked in the database. The isotopic inventory is tracked along with the volume of material that is transferred which is saved as additional data input. Where multiple transfers of filtration material are accumulated in a storage tank, the activity from each transfer is added to the total in the tank. Radioactive decay is accounted for in the running inventory. When the filtration material is transferred to a waste container for shipment for disposal, the quantity of material and isotopic activity is tracked to the waste container. Those of skill will appreciate that the implementation of the methodology of the present invention would ultimately depend on specific system design at each nuclear power plant and the process would be customized to the individual system. Also, whereas nuclear power plants frequently contain alternate sampling points for both liquid process fluids and solid waste streams, these alternate sample points can be evaluated to confirm or refine the primary sample data as necessary.

The invention claimed is:

1. A method of determining the presence of regulated radionuclides and their concentration in filter material used to remove the radionuclides from fluid used to cool a reactor of a nuclear power plant, comprising the steps of:
   a. taking multiple samples of the reactor cooling fluid regularly over a defined period of time from a first sample point,
   b. measuring the presence and concentration of a set of directly measurable fission and activation produced regulated radionuclides through gamma spectroscopy analysis of each the multiple cooling fluid samples,
   c. calculating an overall release rate of radioactivity from the reactor as a function of the removal rate of the filter material,
   d. determining the production rates and concentrations of a set of non-gamma emitting fission produced regulated radionuclides in each of the multiple cooling fluid samples by determining their release rates and summing the activity contributions from intact fuel, tramp fuel and fuel defects as a function of the ratios of directly measured gamma emitting fission produced $^{132}$I, $^{133}$I, $^{134}$I and $^{135}$I to directly measured gamma emitting fission produced $^{131}$I which ratios vary according to release mechanisms of recoil, diffusion and knockout,
   e. determining the total concentration of non-gamma emitting activation produced regulated radionuclides by inference from the concentrations of the directly measurable activation produced regulated radionuclides based on known ratios there between,
   f. keeping a running total of the concentration of the gamma emitting fission and activation produced regulated radionuclides and of the non-gamma emitting fission and activation produced regulated radionuclides accumulated in the filter material over the defined period of time.

2. The method as defined in claim 1 and further including the steps of determining the concentration of regulated radionuclides in the filter material contributed by secondary sources over the defined period of time by periodically sampling the secondary source and then calculating a cumulative activity there from and adding that amount to the total activity.

3. The method as defined in claim 1 and further including the step of moving one or more volumes of filter material each used over a defined period of time to a storage tank and keeping a running total of the concentration of regulated radionuclides accumulated in each volume of filter material moved to the storage tank.

4. The method as defined in claim 3 and further including the step of tracking the total concentration of regulated radionuclides and volume of filter material in a final waste form as transfers are made from the storage tank to a transportation or disposal container.

5. The method as defined in claim 1 and further including the steps of correcting the activity concentration of the regulated radionuclides in the filter material based on the radioactive decay rates thereof.

6. The method as defined in claim 2 and further including the step of correcting the activity concentration of the regulated radionuclides in the filter material based on the radioactive decay rates thereof.

7. The method as defined in claim 4 and further including the step of correcting the activity concentration of the regulated radionuclides contained in the filter material based on the decay rates thereof up to the point of transfer of the filter material to a storage container.

* * * * *